United States Patent Office 2,956,076
Patented Oct. 11, 1960

2,956,076

CYCLOPROPANE-FORMAMIDOMALONATE INTERMEDIATES AND PROCESS

John A. Carbon, William B. Martin, and Leo E. Swett, Waukegan, Ill., assignors to Abbott Laboratories, North Chicago, Ill., a corporation of Illinois No Drawing. Filed July 7, 1958, Ser. No. 746,637

1 Claim. (Cl. 260—468)

This invention relates to novel chemical intermediates and to a process of preparing α-amino-methylenecyclopropanepropionic acid therefrom. The compounds prepared by the process hereafter disclosed are methylenecyclopropanemethyl diloweralkyl formamidomalonates which are structurally presented as:

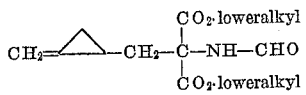

These compounds are useful as chemical intermediates in the preparation of a compound which is orally effective as a hypoglycemic agent; that is, a compound which reduces blood sugar upon oral ingestion.

The compounds of this invention are prepared by reacting a halide of a methylenecyclopropanemethyl p-substituted benzenesulfonate, such as p-toluenesulfonyl, p-nitrobenzenesulfonyl, p-bromobenzenesulfonyl and the like, with a diloweralkyl formidomalonate. The benzenesulfonate compounds are prepared by reacting methylenecyclepropanemethanol with a p-substituted benzenesulfonyl halide as more fully disclosed in co-pending application, Serial No. 746,600, filed of even date herewith. The cyclopropane alcohol is prepared by reducing a loweralkyl methylenecyclopropanecarboxylate with a metal hydride as disclosed in greater detail in co-pending application, Serial No. 746,636, filed of even date herewith, now U.S. Patent 2,921,966. The carboxylate is prepared by refluxing a loweralkyl-2-halo-2-methylcyclopropanecarboxylate with a metal hydride by the procedure presented in co-pending application, Serial No. 746,638, filed of even date herewith. The loweralkyl halogenated methylcyclopropanecarboxylate is prepared by reacting an unsaturated haloalkyl with a loweralkyl diazoacetate, as more fully disclosed in co-pending application, Serial No. 746,635, filed of even date herewith. The novel compound of this invention is subsequently hydrolyzed and decarboxylated to form the active hypoglycemic agent, α-amino-methylenecyclopropanepropionic acid. The active hypoglycemic agent is also known as hypoglycin A.

Hypoglycin A is one of the components extracted from the fruit Blighia sapida. This fruit is commonly known as Ackee. A second hypoglycemic component present in said fruit is known as hypoglycin B. Hypoglycin A has been widely investigated regarding its pharmacological and chemical properties. Physical and chemical constants of hypoglycin A and its hypoglycemic activity have been described by C. H. Hassall and K. Reyle in "Biochem. Journ.," volume 60, page 324 (1955), and "Nature," volume 173, page 356 (1954). The chemical structure of hypoglycin A was definitely established by C. V. Holt and W. Leppla in "Angewandte Chemie," volume 70, page 25 (1958).

The following examples are presented as an embodiment of the process which produces the novel compound. It is not intended that said examples be construed as an exclusive illustration.

EXAMPLE I

Diethyl formamido (methylenecyclopropylmethyl)-malonate

To 25 ml. of dry re-distilled N,N-dimethylformamide is added 0.74 gram (0.031 mole) of sodium hydride and 6.29 grams (0.031 mole) of diethyl formamidomalonate. The mixture is allowed to stand at room temperature for one-half hour, during which period the mixture is protected from atmospheric moisture by a drying tube. The mixture is then filtered through a plug of glass wool to remove excess sodium hydride. The clear, light-yellow solution is treated with 7.1 grams (0.0298 mole) of methylenecyclopropylmethyl p-toluenesulfonate, allowed to stand at room temperature overnight and then heated on a steam bath for two hours. The N,N-dimethylformamide is removed in vacuo, the residue is treated with 50 ml. of water, the solution is adjusted to pH 5 and the product is extracted into chloroform. The chloroform extracts are dried over anhydrous magnesium sulfate and the solvent is removed in vacuo. The product, diethyl formamido(methylenecyclopropylmethyl)malonate, is left as an oil.

The intermediate of Example I is also prepared by alkylating methylenecyclopropylmethyl para-substituted benzenesulfonates, such as p-nitrobenzenesulfonate and p-bromobenzenesulfonate, with diethylformidomalonate according to the procedural steps set out in Example I.

EXAMPLE II

α-Amino-2-methylenecyclopropanepropionic acid

The oily product of Example I (5.0 grams) is mixed with 35 ml. of 10% aqueous sodium hydroxide and heated on a steam bath for five hours. The resulting solution is washed with ether and decolorized with activated charcoal. The light-yellow solution is acidified with glacial acetic acid and heated on a steam bath for 1½ hours. Carbon dioxide is continuously evolved during this period. The reaction mixture is evaporated to dryness in vacuo at 30–35° C., and the solid residue is extracted with 75 ml. of boiling 12 A ethanol. Paper chromatography of the ethanol extract and the insoluble solid indicates that all of the α-amino-2-methylenecyclopropanepropionic acid is present in the ethanol extract. This extract is evaporated to dryness in vacuo and the resulting solid is chromatographed over powdered cellulose using n-butanol saturated with water as the eluent. The fraction of the eluent which gives a positive Ninhydrin test for amino acid is evaporated, and a white crystalline solid is collected. The product is obtained as colorless platelets from water-acetone, melting point greater than 300° C.

Analysis.—Calcd. for $C_7H_{11}NO_2$. Calculated: C, 59.54%; H, 7.85%; N, 9.92. Found: C, 59.73%; H, 7.78%; N, 9.92%.

The collected product is shown to be identical with natural hypoglycin A by paper chromatography, electrophoresis and infra red spectra.

Others may practice the invention in any of the numerous ways which will be suggested by this disclosure to one skilled in the art. All such practice of the invention is considered to be a part hereof provided it falls within the scope of the appended claim.

We claim:
Diethyl formamido(methylenecyclopropylmethyl)malonate.

References Cited in the file of this patent

Meek et al.: J. Am. Chem. Soc., 77, 6675 to 6677 (1955).

UNITED STATES PATENT OFFICE
CERTIFICATION OF CORRECTION

Patent No. 2,956,076                           October 11, 1960

John A. Carbon et al.

It is hereby certified that error appears in the above numbered patent requiring correction and that the said Letters Patent should read as corrected below.

In the grant, lines 1 and 2, and in the heading to the printed specification, line 4, for "Leo E. Swett", each occurrence, read -- Leo R. Swett --.

Signed and sealed this 2nd day of May 1961.

(SEAL)
Attest:

ERNEST W. SWIDER                                    DAVID L. LADD
Attesting Officer                                      Commissioner of Patents